US012702981B2

(12) United States Patent
Abe et al.

(10) Patent No.: US 12,702,981 B2
(45) Date of Patent: Aug. 11, 2026

(54) METHOD FOR MANUFACTURING MICROCHIP FOR BLOOD COAGULATION TEST

(71) Applicant: FUJIMORI KOGYO CO., LTD., Tokyo (JP)

(72) Inventors: Masato Abe, Tokyo (JP); Takao Sato, Tokyo (JP); Tomoko Wada, Tokyo (JP); Tomoka Nagasato, Tokyo (JP); Kazuya Hosokawa, Tokyo (JP)

(73) Assignee: ZACROS Corporation, Tokyo (JP)

( * ) Notice: Subject to any disclaimer, the term of this patent is extended or adjusted under 35 U.S.C. 154(b) by 506 days.

(21) Appl. No.: 18/254,817

(22) PCT Filed: Nov. 26, 2021

(86) PCT No.: PCT/JP2021/043397
§ 371 (c)(1),
(2) Date: May 26, 2023

(87) PCT Pub. No.: WO2022/114129
PCT Pub. Date: Jun. 2, 2022

(65) Prior Publication Data

US 2024/0024875 A1 Jan. 25, 2024

(30) Foreign Application Priority Data

Nov. 27, 2020 (JP) ................................ 2020-197244

(51) Int. Cl.
*B01L 3/00* (2006.01)

(52) U.S. Cl.
CPC ... *B01L 3/502761* (2013.01); *B01L 3/502707* (2013.01); *B01L 2200/12* (2013.01);
(Continued)

(58) Field of Classification Search
CPC ......... B01L 3/502761; B01L 3/502707; B01L 2200/16; B01L 2200/12; B01L 2300/0663;
(Continued)

(56) References Cited

U.S. PATENT DOCUMENTS

| | | | | |
|---|---|---|---|---|
| 8,614,056 B2 * | 12/2013 | Davis ................ | B01L 3/502761 435/6.11 |
| 2002/0150502 A1 * | 10/2002 | Weigl ................. | G01N 15/1456 422/68.1 |

(Continued)

FOREIGN PATENT DOCUMENTS

| | | |
|---|---|---|
| EP | 2040073 A1 | 3/2009 |
| EP | 2228657 B1 | 10/2014 |

(Continued)

OTHER PUBLICATIONS

International Search Report issued in International Application No. PCT/JP2021/043397, mailed on Jan. 11, 2022.

(Continued)

*Primary Examiner* — Dennis White
(74) *Attorney, Agent, or Firm* — Knobbe, Martens, Olson & Bear, LLP

(57) ABSTRACT

A method for manufacturing a microchip for a blood coagulation test includes preparing a substrate which has, in the surface thereof, a groove serving as a flow channel, and has a first through-hole serving as an inlet and provided on one end side of the groove. A film having a surface coated with collagen and/or tissue thromboplastin is prepared so as to cover a region of a portion on the flow channel when the film is bonded to the surface, of the substrate, having the groove therein overlaps the surface, of the film, coated with the collagen and/or tissue thromboplastin.

9 Claims, 5 Drawing Sheets

(52) U.S. Cl.
CPC ... *B01L 2200/16* (2013.01); *B01L 2300/0663* (2013.01); *B01L 2300/069* (2013.01); *B01L 2300/0816* (2013.01)

(58) Field of Classification Search
CPC ....... B01L 2300/069; B01L 2300/0816; G01N 33/86; G01N 33/4905; G01N 2333/78; G01N 2333/7454
See application file for complete search history.

(56) References Cited

U.S. PATENT DOCUMENTS

| | | | | |
|---|---|---|---|---|
| 2006/0246533 | A1* | 11/2006 | Fathollahi | G01N 33/6842 435/23 |
| 2009/0311675 | A1 | 12/2009 | Hosokawa | |
| 2010/0267066 | A1 | 10/2010 | Hosokawa et al. | |
| 2011/0039285 | A1 | 2/2011 | Sadaba Champetier De Ribes et al. | |
| 2011/0142716 | A1 | 6/2011 | Hirayama et al. | |
| 2011/0151500 | A1 | 6/2011 | Hosokawa et al. | |
| 2012/0107851 | A1 | 5/2012 | Killard et al. | |
| 2012/0301966 | A1 | 11/2012 | Hosokawa et al. | |
| 2013/0083311 | A1 | 4/2013 | Li et al. | |
| 2013/0112612 | A1 | 5/2013 | Blankenstein et al. | |
| 2015/0323495 | A1* | 11/2015 | Gibson, II | G01N 27/44721 204/603 |
| 2017/0023596 | A1* | 1/2017 | Hosokawa | G01N 33/54306 |
| 2018/0017586 | A1* | 1/2018 | Levner | G01N 33/80 |
| 2018/0021777 | A1* | 1/2018 | Giri | B01L 3/502715 422/73 |
| 2019/0118181 | A1* | 4/2019 | Olsson | G01N 33/54306 |
| 2019/0216359 | A1 | 7/2019 | Chuang et al. | |
| 2019/0324045 | A1* | 10/2019 | Kolb | B01L 3/502723 |

FOREIGN PATENT DOCUMENTS

| | | | |
|---|---|---|---|
| EP | 3130920 | B1 | 12/2020 |
| JP | 2007-024522 | A | 2/2007 |
| JP | 2008-008880 | A | 1/2008 |
| JP | 2010-539503 | A | 12/2010 |
| JP | 2012-524894 | A | 10/2012 |
| JP | 2018-007640 | A | 1/2018 |
| WO | WO 2007/046450 | A1 | 4/2007 |
| WO | WO 2009/069656 | A1 | 6/2009 |
| WO | WO 2010/018833 | A1 | 2/2010 |
| WO | WO 2010/021263 | A1 | 2/2010 |
| WO | WO 2011/099569 | A1 | 8/2011 |
| WO | WO 2015/156322 | A1 | 10/2015 |

OTHER PUBLICATIONS

Extended European Search Report dated Oct. 14, 2024, issued in corresponding EP Application No. 21898101.7 in 11 pages.

K. Hosokawa et al., "A novel automated microchip flow-chamber system to quantitatively evaluate thrombus formation and antithrombotic agents under blood flow conditions" Journal of Thrombosis and Haemostasis, vol. 9, No. 10, 2011, 2029-2037.

European Office Action for corresponding App. No. 21898101.7, dated Jun. 17, 2026 (in 6 pages).

* cited by examiner

METHOD FOR MANUFACTURING MICROCHIP FOR BLOOD COAGULATION TEST

TECHNICAL FIELD

The present invention relates to a method for manufacturing a microchip for testing blood coagulation.

BACKGROUND ART

In thrombus formation or hemostatic reaction in the body, primary hemostasis, which occurs by platelet adhesion to collagen and aggregation reaction, and secondary hemostasis, which subsequently occurs by production of fibrin gel by activation of blood coagulation factors, proceed at the same time. Under arterial conditions, primary hemostasis, which mainly occurs by platelet aggregation reaction, is dominant Under venous conditions, secondary hemostasis, which occurs by blood coagulation reaction, is dominant over primary hemostasis, resulting in formation of thrombi containing a larger amount of fibrin.

The present inventors have developed a microchip for testing blood coagulation abilities such as thrombus formation and platelet function, wherein a blood sample is allowed to flow through a flow path provided in the microchip while the pattern of the pressure exerted by the blood sample passing therethrough is analyzed (Patent Documents 1 to 5).

The microchip used for the test is produced mainly by a method comprising: providing two substrates; forming a flow path in one of the substrates; forming an inlet and a penetrating hole serving as an air hole in the other substrate; and attaching the substrates to each other.

However, since the production of the microchip by this production method is costly and time-consuming, a method that enables simpler preparation of a microchip has been demanded.

PRIOR ART DOCUMENTS

Patent Documents

Patent Document 1: WO 2007/046450
Patent Document 2: WO 2009/069656
Patent Document 3 WO 2010/018833
Patent Document 4: WO 2011/099569
Patent Document 5: WO 2015/156322

SUMMARY OF THE INVENTION

Problems to be Solved by the Invention

An object of the present invention is to provide a method for simply and inexpensively manufacturing a microchip for testing blood coagulation ability, which test is carried out by allowing a blood sample to flow through a flow path provided in the microchip.

Means for Solving the Problems

The present inventors intensively studied in order to solve the above problem. As a result, the inventors discovered that a microchip can be simply produced by attaching a substrate comprising on a surface thereof a groove serving as a flow path, wherein the substrate comprises a first penetrating hole serving as an inlet at one end of the groove and a second penetrating hole serving as an air hole at the other end of the groove, to a film on a surface of which collagen and/or tissue thromboplastin is/are applied in such a manner that an area on the flow path is covered therewith when the film is attached to the substrate, and that the obtained microchip does not show leakage and has an ability equivalent to those of conventional microchips prepared by layering of two substrates on each other. Further, the present inventors discovered conditions regarding the type of the adhesive agent, the application method, and the like that enable efficient attachment of the substrate to the film, thereby completing the present invention. In the present invention, a film is used for the production of a microchip, wherein the film is attached to a substrate to prepare the microchip. Conventionally, there has been the risk of occurrence of leakage that prevents application of a microchip to a blood coagulation evaluation test, which leakage is caused by, for example, detachment of a film due to a pressure exerted by a blood sample flowing through a flow path. However, inventive activity by the present inventors led to successful production of a microchip which does not suffer from the leakage, and which is capable of withstanding the pressure increase caused by allowing the blood to flow to cause coagulation reaction.

More specifically, the present invention provides a method for manufacturing a microchip for testing blood coagulation, the method comprising:

a step of providing a substrate comprising on a surface thereof a groove serving as a flow path, wherein the substrate comprises a first penetrating hole serving as an inlet at one end of the groove and a second penetrating hole serving as an air hole at the other end of the groove;

a step of providing a film on a surface of which collagen and/or tissue thromboplastin is/are applied in such a manner that an area on the flow path is covered therewith when the film is attached to the substrate; and a step of attaching the film on the substrate in such a manner that the surface of the substrate on which the groove is formed and the surface of the film on which collagen and/or tissue thromboplastin is/are applied overlap each other.

The attachment is preferably carried out using an adhesive agent and/or a gluing agent, and preferred examples of the adhesive agent include UV-curable adhesive agents such as acrylic UV-curable adhesive agents, for example, UVX-8204 (manufactured by Denka Company Limited), UVX-8400 (Denka Company Limited), SX-UV100A (manufactured by Cemedine Co., Ltd.), SX-UV200 (manufactured by Cemedine Co., Ltd.), BBX-UV300 (manufactured by Cemedine Co., Ltd.), U-1340 (Chemitech Inc.), U-1455B (Chemitech Inc.), U-1558B (Chemitech Inc.), Aronix UV-3000 (Toagosei Co., Ltd.), TB3094 (ThreeBond Co., Ltd.), and Hitaloid 7975D (Hitachi Chemical Company, Ltd.). Regarding the composition, for example, UVX-8204 is a UV-curable adhesive agent having the following characteristics: the concentration range of the polymer compound, 60 to 80% by mass; the ratio of acrylic ester in the constituent monomers, 20 to 40 mol %; the ratio of ethyl acrylate in the constituent monomers, less than 1.0 mol %. The adhesive and/or gluing is/are preferably applied at a thickness of 5 to 15 μm such that a margin of 200 to 1000 μm is secured on each of both sides of the width of the flow path. The adhesive agent and/or gluing agent is/are preferably applied to the substrate by screen printing. The attachment surface of the substrate and/or the attachment surface of the film is/are preferably hydrophilized in such a manner that the water contact angle is 40 to Preferred examples of the hydrophilization treatment include plasma treatment, corona treatment, and excimer treatment.

The present invention also provides a microchip for testing blood coagulation, comprising:

- a substrate comprising on a surface thereof a groove serving as a flow path, wherein the substrate comprises a first penetrating hole serving as an inlet at one end of the groove and a second penetrating hole serving as an air hole at the other end of the groove; and
- a film on a surface of which collagen and/or tissue thromboplastin is/are applied in such a manner that an area on the flow path is covered therewith when the film is attached to the substrate,
- wherein the substrate and the film are attached to each other in such a manner that the surface of the substrate on which the groove is formed and the surface of the film on which collagen and/or tissue thromboplastin is/are applied overlap each other.

Effect of the Invention

According to the present invention, a microchip to be used for testing blood coagulation ability by allowing a blood sample to flow through a flow path provided in the microchip can be simply and inexpensively manufactured.

BRIEF DESCRIPTION OF THE DRAWINGS

FIG. 1A is a plan view of a substrate; FIG. 1B is a plan view of a film; FIG. 1C is a plan view of the substrate after application of an adhesive agent thereto; FIG. 1D is a plan view illustrating the substrate and the film attached to each other.

FIG. 3A is a plan view of a substrate; FIG. 3B is a plan view of a film; FIG. 3C is a plan view of the substrate after application of an adhesive agent thereto; FIG. 3D is a plan view illustrating the substrate and the film attached to each other.

DESCRIPTION OF EMBODIMENTS

The manufacturing method of the present invention is a method for manufacturing a microchip for testing blood coagulation in which a flow path is formed, which microchip is used for evaluating blood coagulation abilities (including thrombogenic capacity and platelet aggregability) by allowing a blood sample to flow through the flow path and measuring the pressure exerted when the blood sample passes through the flow path, the method comprising:

a step of providing a substrate comprising on a surface thereof a groove serving as a flow path, wherein the substrate comprises a first penetrating hole serving as an inlet at one end of the groove and a second penetrating hole serving as an air hole at the other end of the groove;

a step of providing a film on a surface of which collagen and/or tissue thromboplastin is/are applied in such a manner that an area on the flow path is covered therewith when the film is attached to the substrate; and a step of attaching the film on the substrate in such a manner that the surface of the substrate on which the groove is formed and the surface of the film on which collagen and/or tissue thromboplastin is/are applied overlap each other.

First, the microchip for testing blood properties of the present invention is described with reference to drawings. However, the microchip for testing blood properties of the present invention is not limited to the following embodiments.

FIGS. 1A to 1D are schematic diagrams illustrating an example of the form of a microchip 10 of the present invention. The following description is based on FIGS. 1A to 1D.

Figure 1:
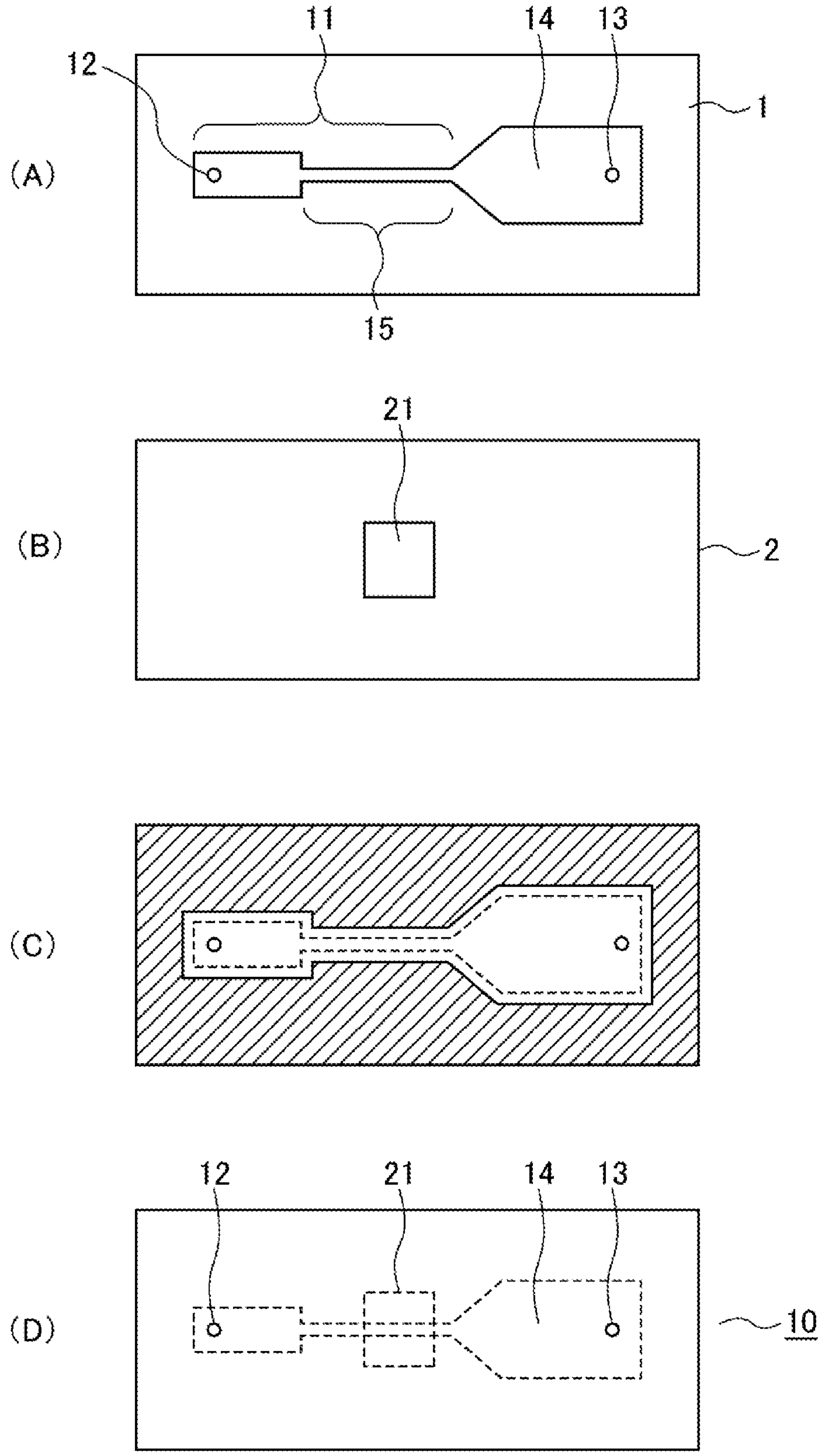
FIGS. 1A to 1D are diagrams illustrating one mode of the method for manufacturing a microchip of the present invention.

FIG. 1A is a plan view of a substrate 1 having a surface on which a groove serving as a flow path 11 of the microchip 10 is formed. In a first-end side of the groove, a penetrating hole serving as an inlet 12 for the blood sample is formed. In the other-end side, a penetrating hole serving as an air hole 13 is formed. Two or more flow paths may be formed.

Although the groove may have a uniform width, the downstream side is preferably narrower than the inlet side. The groove may have a shape in which the width gradually decreases, or a shape in which the width decreases in a stepwise manner as illustrated in FIG. 1A. By placement of the microchip on a heater, the blood that passes through the flow path is warmed in the upstream portion (inlet side), and then reaches a thrombus-forming section. Further, since coagulation easily occurs when the blood passes through a narrow section 15, pressure increase in accordance with the coagulation can be easily detected. Such an embodiment is therefore suitable for the measurement of blood coagulation.

In the other-end side, a portion having a larger width serving as a waste liquid storage section 14 is preferably provided. Thus, in one embodiment of the present invention, the groove has a shape in which the waste liquid storage section 14 is connected to the end opposite to the inlet-side end of the flow path 11. Therefore, the blood that has passed through the flow path can be retained in the waste liquid storage section.

In the waste liquid storage section, an absorbent material having a size which allows placement of the material in the waste liquid storage section may be arranged. Examples of the blood absorbent material include sponges and fabrics. The blood absorbent material may be impregnated with a solution of an anticoagulant such as citric acid, EDTA, or heparin. By this, the waste liquid can be prevented from adversely affecting the measurement results due to its coagulation.

In the middle of the flow path, for example, in the narrow section, a plurality of flow path separation walls such as those disclosed in Patent Documents 3 and 4 may be provided along the direction of blood flow, to divide the width of the flow path into a plurality of segments. By providing the separation walls in the reaction section to which collagen and tissue thromboplastin are applied, clogging due to thrombus formation can be allowed to proceed faster in the separation wall portion than in other portions. Since this results in a pressure increase, pressure analysis specifically reflecting the thrombus formation in the separation walls is possible.

The cross-sectional shape of the groove serving as the flow path is not limited, and examples of the shape include a recessed shape, U-shape, and V-shape. The depth of the groove serving as the flow path is preferably 10 to 200 μm, and the width of the groove is preferably 10 μm to 3 mm. The length of the portion serving as the flow path is, for example, 3 mm to 3 cm.

The groove serving as the waste liquid storage section is preferably deeper than the groove corresponding to the flow path, from the viewpoint of storage of a large amount of waste liquid. The depth of the groove serving as the waste liquid storage section is, for example, 0.5 to 10 mm. The area of the groove serving as the waste liquid storage section is, for example, 0.3 to 2 $cm^2$.

The size of the penetrating hole serving as the inlet 12 is not limited as long as the penetrating hole allows injection of the blood sample using a microsyringe or the like. Its diameter is, for example, 0.2 to 3 mm.

The size of the penetrating hole serving as the air hole 13 is not limited as long as the hole can function as an air hole. Its diameter is, for example, 0.1 to 2 mm.

The material of the microchip is preferably a metal, glass, plastic, silicone, or the like. From the viewpoint of uses in blood monitoring (especially in image analysis), the material is preferably transparent. From the viewpoint of formation of a flow path through which the blood sample flows, the material is preferably a plastic, especially preferably a transparent plastic. For example, in cases where an ABS resin, a polymethyl methacrylate (PMMA) resin, polystyrene, or polycarbonate is used, the flow path can be easily formed, and blood coagulation at unintended sites can be suppressed. In particular, in cases where a constituent substance of a thrombus is evaluated by fluorescence analysis, a cycloolefin polymer (COP) or a cycloolefin copolymer (COC) is preferably used. In cases where the chip is prepared using a COP or COC, a fluorescent dye(s) for labeling platelets, leukocytes, and/or fibrin may be added to the blood to enable the evaluation of a thrombus formed in the chip, without being affected by autofluorescence of the chip material. In this process, autofluorescence of the UV-curable adhesive agent is not problematic since the UV-curable adhesive agent layer is sufficiently thin. Examples of the fluorescent dye for labeling platelets include quinacrine, and examples of the fluorescent dye for labeling leukocytes include Hoechst. Examples of the fluorescent dye for labeling fibrin include anti-fibrin antibodies labeled with a fluorescent substance.

The groove(s) and the holes to be provided on the substrate of the microchip may be formed using a cutter or laser beam, or may be formed using the 3D printing technique. In cases where the material of the microchip is a plastic, they may also be formed by injection molding. In cases of the formation by injection molding, microchips having uniform quality can be efficiently prepared, which is preferred.

FIG. 1B is a plan view of a film 2. The material of the film is preferably a transparent plastic, especially preferably a polyethylene terephthalate resin (PET resin). In cases where a constituent substance of a thrombus is evaluated by fluorescence analysis, the material is preferably a COP or COC. The thickness of the film is, for example, 50 to 200 μm.

The film is coated with collagen and/or tissue thromboplastin (also called tissue factor) at a position 21 that overlaps, when the film is layered on the substrate 1, with part of the downstream side of the flow path 11, which part is the narrow section 15 in the present case. After the layering of the coated section 21 on the substrate 1, the coated section 21 functions as the reaction section where blood coagulation reaction easily occurs.

The amount of the collagen coating is not limited as long as a concentration at which blood coagulation reaction occurs can be achieved. The amount of the collagen coating is, for example, 1 to 100 μg/$cm^2$, especially preferably 40 μg/$cm^2$.

The amount of the tissue thromboplastin coating is not limited as long as a concentration at which blood coagulation reaction occurs can be achieved. The amount of the tissue thromboplastin coating is, for example, 1 to 100 μg/$cm^2$, especially preferably 3 μg/$cm^2$.

A collagen and/or tissue thromboplastin coating with high adhesive strength can be simply formed by, for example, as described in JP 05-260950 A and Blood. 1995 Apr. 1; 85(7): 1826-35, a method in which collagen is dissolved in an acidic solution followed by applying the resulting solution to a predetermined position of a substrate made of glass, polystyrene, or the like to which hydrophilicity is given, and washing and drying the substrate.

In cases where a hydrophobic resin or the like is to be coated, the coating can be carried out by subjecting the resin surface to hydrophilization treatment, applying a collagen solution to a desired area, and then subjecting the resulting product to natural drying or drying under reduced pressure.

In cases where a plastic is used as the substrate, coating with collagen or collagen supplemented with tissue thromboplastin can be easily carried out by subjecting the surface of the plastic to hydrophilization treatment, applying a collagen solution to a desired area using a dispenser such as a pipette or a syringe, and then subjecting the resulting product to natural drying or drying under reduced pressure.

The coating with tissue thromboplastin or tissue factor can be achieved not only by bonding such as ionic bonding or hydrophobic bonding, but also by, for example, stable immobilization by covalent bonding which is achieved by introducing amino groups or carboxyl groups to the substrate and performing dehydration condensation using water-soluble carbodiimide or the like. Alternatively, tissue thromboplastin may be mixed with collagen, and the resulting mixture may be applied and dried to achieve the coating with tissue thromboplastin and the coating with collagen at the same time.

An adhesive agent and/or a gluing agent is/are preferably used for the attachment of the film 2 to the substrate 1.

Examples of the adhesive agent include (meth)acrylate resin adhesives, natural rubber adhesives, urethane resin adhesives, ethylene-vinyl acetate resin emulsion adhesives, ethylene-vinyl acetate resin adhesives, epoxy resin adhesives, vinyl chloride resin solvent adhesives, chloroprene rubber adhesives, cyanoacrylate adhesives, silicone adhesives, styrene-butadiene rubber solvent adhesives, nitrile rubber adhesives, nitrocellulose adhesives, phenol resin adhesives, modified silicone adhesives, polyester adhesives, polyamide adhesives, polyimide adhesives, olefin resin adhesives, vinyl acetate resin emulsion adhesives, polystyrene resin solvent adhesives, polyvinyl alcohol adhesives, polyvinylpyrrolidone resin adhesives, polyvinyl butyral adhesives, polybenzimidazole adhesives, polymethacrylate resin solvent adhesives, melamine resin adhesives, urea resin adhesives, and resorcinol adhesives. The adhesives may be used individually or as a mixture of two or more thereof.

Examples of the gluing agent include rubber gluings, (meth)acrylate resin gluings, silicone gluings, urethane gluings, vinyl alkyl ether gluings, polyvinyl alcohol gluings, polyvinyl pyrrolidone gluings, polyacrylamide gluings, and cellulose gluings. Such gluings may be used individually or as a mixture of two or more thereof.

The adhesive agent or gluing agent is preferably photocurable (either radical-reactive or cationic-polymerizable), more preferably UV-curable. In cases where a UV-curable adhesive agent or UV-curable gluing agent is used, curing reaction can be quickly initiated by UV irradiation after the application step, to enable the bonding.

The UV-curable adhesive agent is more preferably an acrylic UV-curable adhesive agent, such as UVX-8204 (manufactured by Denka Company Limited), UVX-8400 (Denka Company Limited), SX-UV100A (manufactured by Cemedine Co., Ltd.), SX-UV200 (manufactured by Cemedine Co., Ltd.), BBX-UV300 (manufactured by Cemedine Co., Ltd.), U-1340 (Chemitech Inc.), U-1455B (Chemitech Inc.), U-1558B (Chemitech Inc.), Aronix UV-3000 (Toagosei Co., Ltd.), TB3094 (ThreeBond Co., Ltd.), or Hitaloid 7975D (Hitachi Chemical Company, Ltd.).

The UV-curable gluing agent is more preferably an acrylic UV-curable gluing agent, such as UV-36301D80 (manufactured by Mitsubishi Chemical Corporation), UX-3204 (Nippon Kayaku Co., Ltd.), or Finetack RX-104 (DIC Corporation).

An acrylic UV-curable adhesive agent or acrylic UV-curable gluing agent shows favorable adhesion to a wide range of plastic materials, and quick production of strength is possible after UV irradiation. The viscosity of the adhesive agent or gluing agent for the attachment of the film 2 to the substrate 1 is preferably, for example, 2000 to 31,000 mPa·s.

The following is an example of the method of attaching the substrate and the film to each other using an adhesive agent. However, a gluing agent may be used instead of an adhesive agent, and the following description also applies to the gluing agent.

As shown in FIG. 1C, the adhesive agent is preferably applied to an area other than the flow path (including an inlet and outlet) of the molded article (substrate 1). In cases where extrusion of the adhesive into the flow path occurs during the attachment, low-molecular-weight substances eluted from the adhesive agent and a change in the flow path shape due to the extruded adhesive agent may inhibit blood coagulation reaction or reaction (activation) of cells such as platelets and leukocytes. In particular, regarding the area to which collagen and/or tissue thromboplastin is/are applied for allowing thrombus formation, the adhesive agent is preferably applied such that a gap (margin) of 200 μm to 1000 μm is secured from each of both edges in the width direction of the flow path, depending on the conditions of the bonding. In this case, the thickness of the adhesive agent is preferably 5 to 15 μm. In FIG. 1C, the part corresponding to the groove of FIG. 1A is indicated by a dotted line. An area larger than the part corresponding to the groove is secured by providing the gap, and the adhesive agent (shaded area) is applied such that this area is avoided. Such application of the adhesive agent, carried out such that the gap is secured from the edge of the flow path, may be effective not only in cases of a blood coagulation test, but also in cases of, for example, a use in which cells are cultured in the flow path wherein the cells may be affected by toxicity of low-molecular-weight substances eluted from the adhesive agent.

For accurate application of the adhesive agent to the desired site, the adhesive agent is preferably applied by screen printing. In the preparation of the area to which the adhesive agent is not applied, a polyimide tape or the like may be applied to the area of the molded article where the application of the adhesive agent should be avoided, to provide a mask. The adhesive agent may then be applied, and the tape may be peeled off immediately before the bonding. This process simply enables a study at the trial manufacture level, which is preferred. In cases of manufacturing more than a certain number of products, a screen printing plate in which the flow path section of the molded article is masked is preferably used to enable efficient application of the adhesive agent to the area other than the flow path. In this case, a plate in which an area wider than the area of the thrombus-forming flow path by 200 to 1000 μm, preferably by 200 to 400 μm, as measured from each edge of the flow path is masked may be used, and the thickness of the adhesive agent may be set to 5 to 15 μm, depending on the conditions of the bonding. By this, the adhesive agent can be applied while keeping a predetermined distance from the edge of the flow path. From the viewpoint of preventing incorrect positioning of the screen printing plate to the molded article, an additional width of about 20 μm may be included in the area, so that a plate in which an area wider than the width of the flow path by 220 to 1020 μm is masked may be used.

The number of meshes per inch in the screen is, for example, preferably 500 to 730. The mesh opening ratio is, for example, preferably 39 to 47%. The mesh thickness is, for example, preferably 15 to 28 μm. As a result, the film thickness of the applied adhesive agent or gluing agent is preferably 5 to 15 μm.

The film and/or substrate is/are preferably hydrophilized. The hydrophilization treatment is preferably plasma treatment, corona treatment, or excimer treatment. Regarding the specific conditions of the treatment, the water contact angle(s) on the surface(s) of the hydrophilized film and/or the substrate is/are, for example, 40 to 55°. In particular, in cases where collagen and/or tissue thromboplastin is/are applied to the film, the application can be efficiently carried out by preliminarily subjecting the application area to surface treatment such that the water contact angle is 40 to 55°.

FIG. 1D is a plan view of a microchip 10 obtained by attaching a first substrate 1 and a film 2 to each other such that the surface of the substrate 1 on which the groove is formed (adhesive agent application surface) is in contact with the surface of the film 2 to which collagen and/or tissue thromboplastin is/are applied. The dotted lines indicate that a flow path 11, a waste liquid storage sections 14, and the like are present in the microchip 10.

By layering and attaching the film 2 onto the substrate 1, the top portion of the groove serving as the flow path and the waste liquid storage section is covered with the film, to form the flow path through which a blood sample passes and the waste liquid storage section in which the blood sample is stored.

By the layering of the film, one side of each penetrating hole is sealed, and an opening remains only in the side where the film is not layered on the substrate. Thus, the penetrating holes function as an inlet and an air hole.

Example 1

The present invention is described below with reference to Examples, but the present invention is not limited to the following modes.

<Preparation of Microchips>

The substrate 1 shown in FIG. 1A (injection-molded article manufactured by JMC Corporation; acrylonitrile-butadiene-styrene copolymer resin (ABS resin)) (size: 56.2×26.3 mm; thickness, 3.7 mm) was provided. In the substrate 1, the flow path 11 had a length of 35 mm, a depth of 40 pin, and a width of 0.8 mm in the inlet section or 0.2 mm in the narrow section; and the waste liquid storage section 14 had a length of 16.1 mm, a depth of 1.3 mm, and a width of 9.85 mm.

In the substrate 1, the hole serving as the inlet 12 was provided as a penetrating hole having a circular cross-sectional shape with an inner diameter of 2 mm. The hole serving as the air hole 13 was provided as a penetrating hole having a circular cross-sectional shape with an inner diameter of 1 mm.

As the film 2, a PET film (size: 56.2×26.3 mm; thickness, 50 or 125 pin) was used. A position that corresponds to part of the narrow section 15, located in the downstream side of the flow path 11 when the film is layered on the substrate 1, was coated with collagen and tissue thromboplastin (FIG. 1B).

The concentrations of the collagen and the tissue thromboplastin used for the coating, and the coating method, were as follows.

To an area of 15 mm×10 mm at the position corresponding to the narrow section of the flow path of the substrate 1, 38.5 μl of an aqueous solution prepared by mixing 3 mg/ml collagen solution and 0.2 mg/ml tissue thromboplastin solution at 1:1 was applied. In terms of the amounts per area, collagen was applied at 38.5 $\mu g/cm^2$, and tissue thromboplastin was applied at 2.57 $\mu g/cm^2$.

The attachment of the substrate 1 to the film 2 was carried out using the adhesive agents in Table 1 such that the surface of the substrate 1 on which the flow path and the waste liquid storage section were provided and the surface of the film 2 coated with collagen and tissue thromboplastin overlapped each other.

More specifically, an adhesive agent was applied by screen printing to the area excluding the area corresponding to the collagen-coated area on the film 2 and also excluding the area corresponding to the flow path and the waste liquid storage section of the substrate, such that the theoretical film thickness was about 10 μm (FIG. 1C). The film was then attached to the substrate 1 such that the edge of the adhesive-applied area was not less than 250 μm distant from the edge of the flow path. Subsequently, irradiation with an ultraviolet having a continuous wavelength distribution of 254 to 450 nm was carried out for 10 to 20 seconds using a metal halide light source, to initiate the curing reaction of the adhesive for bonding the film 2 to the substrate 1 (FIG. 1D). The obtained microchip was left to stand at normal temperature for not less than 3 days, and then used in a blood coagulation test.

TABLE 1

| Adhesive agent | UVX-8204 | SX-UV100A | BBX-UV300 |
|---|---|---|---|
| Main component | Acrylic | Acrylic copolymer | Acrylic copolymer |
| External appearance | Colorless and transparent | Pale yellow and translucent | Pale yellow and transparent |
| Viscosity (mPa/s) | 16,000 | 35,000 | 55,000 |
| Fixation time (sec) | 22 | 120 | — |
| Curing shrinkage rate | 3.3 | — | — |
| Glass transition point (° C.) | 45 | −25 | |
| Coefficient of linear expansion | | $490 \times 10^{-5}$/° C. | |
| Property | COP-adhesive | | |

The five kinds of microchips shown in Table 2 were prepared. The substrate (molded article) was prepared using an ABS resin. In Table 2, the numbers in the parentheses indicate the film thicknesses expressed in micrometers.

TABLE 2

| | Adhesive agent | Molded article | Film |
|---|---|---|---|
| 1 | SX-UV100A | ABS | PET(50) |
| 2 | SX-UV100A | ABS | PET(125) |
| 3 | BBX-UV300 | ABS | PET(50) |
| 4 | BBX-UV300 | ABS | PET(125) |
| 5 | UVX-8204 | ABS | PET(50) |

<Evaluation of Microchips>

Figure 2:
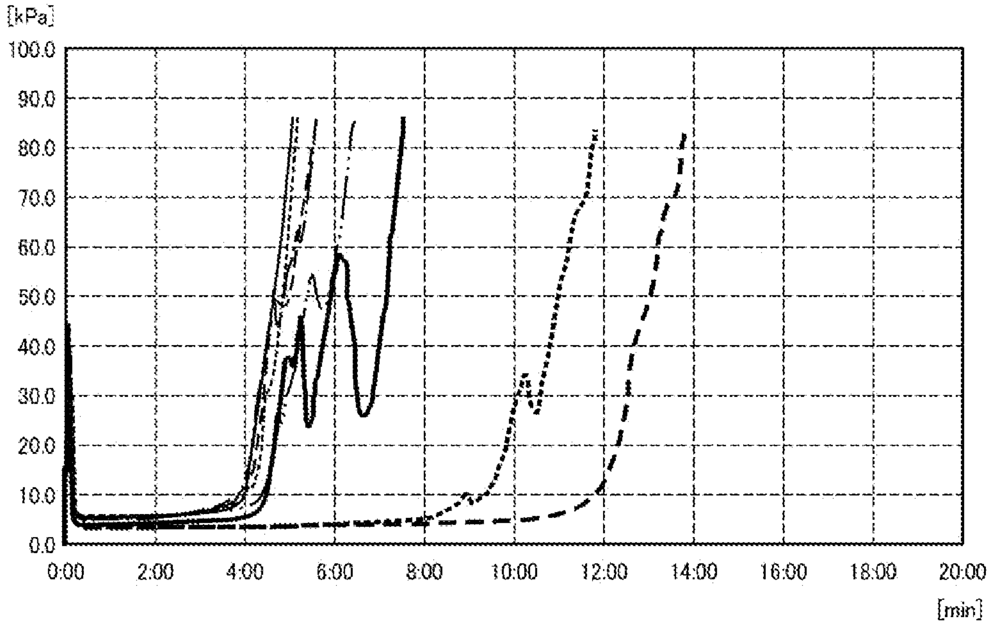
FIG. 2 is a graph showing the result of measurement of the pressure after the introduction of a blood sample to a microchip (FIGS. 1A to 1D) produced by the production method of the present invention (Example 1).

An evaluation was carried out in the same manner as the method described in Example 1, FIG. 2, and the like of Patent Document 5.

More specifically, a syringe containing a blood sample was inserted into the inlet 12 of the microchip 10, and a pump was connected to the syringe. The blood sample was sent at a constant flow rate to achieve the introduction of the blood sample into the flow path of the microchip. The microchip has a narrow section in the flow path, and this section has collagen and tissue thromboplastin applied thereto. Therefore, coagulation reaction is promoted when the blood sample passes through this section, resulting in an increase in the pressure exerted on the pump. By measuring the pressure exerted on the pump, coagulation of the blood can be evaluated.

Whether or not each microchip obtained as described above can be used in this test was evaluated.

The results were as follows.

Microchip 1 showed leakage at the time when the pressure increased to about kPa.

Microchip 2 showed leakage at the time when the pressure increased to about kPa.

Microchip 3 showed leakage at the time when the pressure increased to about kPa.

Microchip 4 showed leakage at the time when the pressure increased to about kPa.

In contrast, microchip 5 did not show leakage even at a pressure higher than kPa, and could be suitably used for the blood coagulation test.

It was thus found that, since leakage may occur depending on the type of the adhesive, there is a limit in the value of the pressure increase that can be employed in the blood coagulation test.

The best microchip among those described above was microchip 5, which was prepared by adhesion using UVX-8204.

Moreover, UVX-8204 showed better applicability in screen printing compared to other adhesives.

FIG. 2 shows the analysis results obtained using microchip 5. In the measurement using microchip 5, a pattern in which a pressure increase occurs as the coagulation reaction proceeds could be detected, and the agent dependence could also be detected. Thus, microchip 5 was found to have an ability equivalent to those of conventional microchips prepared by layering of substrates.

Further, thrombus formation could be visually observed.

Example 2

In relation to the case where the adhesive is applied such that a gap from the flow path is secured, the required width of the gap was investigated. For the purpose of determining the size of the gap, the extent to which the adhesive agent spreads, in other words, the extent to which the adhesive agent application area increases, due to the layering of the film on the substrate having the adhesive agent applied thereto was measured. As the substrate to which the adhesive agent is to be applied, a COP plate material (molding: injection molding, manufactured by MCC Advanced Moldings Co., Ltd.; COP resin: "ZEONOR 1060R", manufactured by Zeon Corporation; plate material size: 59.4×26.2 mm; thickness, 3 mm) on which no flow path is formed was used. As the adhesive agent, UVX-8204 was used. As the film to be attached, a COP film (ZF14-100, a film manufactured by Zeon Corporation; thickness, 100 pin) was used. The following two combinations of the plate material and the film were provided: the combination of an untreated plate material and an untreated film; and the combination of a plate material subjected to surface excimer treatment and a film subjected to surface corona treatment. The adhesive agent was applied by screen printing to the following three kinds of thicknesses by using different types of screen plates: about 5.0 μm, about 10.0 μm, and about 15.0 μm in terms of the theoretical film thickness. A pressure of 1.1 mPa was applied when the film was attached to the plate material to which the adhesive agent was applied. Before the application of the adhesive agent, a polyimide tape having a width of 4 mm was attached to the plate material to provide a mask. Thereafter, the adhesive agent was applied by screen printing, and the polyimide tape was peeled off, followed by layering of the film and application of a pressure. Irradiation with an ultraviolet having a continuous wavelength distribution of 254 to 450 nm was carried out for 10 to 20 seconds using a metal halide light source, to initiate the curing reaction of the adhesive agent for bonding the film to the substrate. Thereafter, the width of the area in which the adhesive agent was not applied was measured, and the measured width was subtracted from 4 mm, which is the width of the polyimide tape. Further, in order to calculate the distance at which the adhesive agent spread in one side of the flow path, the obtained value was divided by 2. By this, the extent to which the adhesive spreads by the bonding of the film under each condition was studied.

As a result of the experiment, when the adhesive agent was applied to the combination of the untreated COP plate material and the untreated COP film such that the theoretical film thickness was about 5.0 μm, and the bonding was performed at a pressure of 1.1 mPa, the adhesive agent spread by 200 μm. When the adhesive agent was applied such that the theoretical film thickness was 10.0 μm, the adhesive agent spread by 250 μm. When the adhesive agent was applied such that the theoretical film thickness was 15 μm, the adhesive agent spread by 400 μm. Thus, in the cases where the adhesive agent was applied to the combination of the untreated COP plate material and the untreated COP film at a film thickness suitable for the bonding, 5 to 15 μm, the adhesive agent spread from both edges of the flow path. It was therefore found that a mask having an additional width of not less than 200 to 400 μm as measured from each edge of the flow path needs to be provided in order to prevent the adhesive agent from flowing into the flow path.

When the adhesive agent was applied to the combination of the COP plate material subjected to surface excimer treatment and the COP film subjected to surface corona treatment such that the theoretical film thickness was about 5.0 μm, and the bonding was performed at a pressure of 1.1 mPa, the adhesive agent spread by 150 μm. When the adhesive agent was applied such that the theoretical film thickness was 10.0 μm, the adhesive agent spread by 250 μm. When the adhesive agent was applied such that the theoretical film thickness was 15 μm, the adhesive agent spread by 1000 μm. Under the conditions where the theoretical film thickness was about 6.0 to 10.0 μm, there was no large difference between the untreated case and the hydrophilized case. However, under the condition where the theoretical film thickness was 15 μm, the distance at which the adhesive agent spreads increased in the hydrophilized case compared to the untreated case. It was thus found that, in cases where the hydrophilized film and plate material are bonded together such that the theoretical film thickness is 15 μm, a mask having an additional width of 1000 μm as measured from each edge of the flow path needs to be provided.

Example 3

In relation to the case where the adhesive agent is applied such that a gap from the flow path is secured, and where the plate material is attached to the film to which a solution prepared by mixing a collagen solution and a tissue thromboplastin solution at 1:1 has been applied, the required width of the gap was investigated. To an area of 15 mm×10 mm in the film side, 38.5 μl of an aqueous solution prepared by mixing a collagen solution and a tissue thromboplastin solution at 1:1 was applied. After drying the aqueous solution, the same procedure as in Example 2 was carried to investigate the extent to which the adhesive agent spreads as a result of the attachment. For the purpose of improving applicability of the reagent, the film was subjected to corona treatment before the application of the reagent. An untreated COP plate material was used. The adhesive agent was applied by screen printing to the following three kinds of thicknesses by using different types of screen plates: about 5.0 μm, about 10.0 μm, and about 15.0 μm in terms of the theoretical film thickness.

As a result of the experiment, when the adhesive agent was applied to the untreated COP plate material such that the theoretical film thickness was about 5.0 μm, and the film to which the aqueous solution prepared by mixing the collagen solution and the tissue thromboplastin solution at 1:1 was applied was attached at a pressure of 1.1 mPa, the adhesive agent spread by about 200 μm. When the adhesive agent was applied such that the theoretical film thickness was 10.0 μm, the adhesive agent spread by about 250 μm. When the adhesive agent was applied such that the theoretical film thickness was 15 μm, the adhesive agent spread by about 750 μm. It was thus found that, in cases where a film to which an aqueous solution of collagen and tissue thromboplastin has been applied is attached to a COP plate material using an adhesive agent with a suitable adhesive agent film thickness, 5 to 15 μm, a mask having an additional width of not less than 200 to 750 μm as measured from each edge of the flow path needs to be provided in order to prevent the adhesive agent from flowing into both edges of the flow path in the bonding.

Example 4

<Preparation of Microchips>

The width of the mask used for the application of the adhesive agent in the preparation of a microchip for testing blood coagulation was studied.

Figure 3:
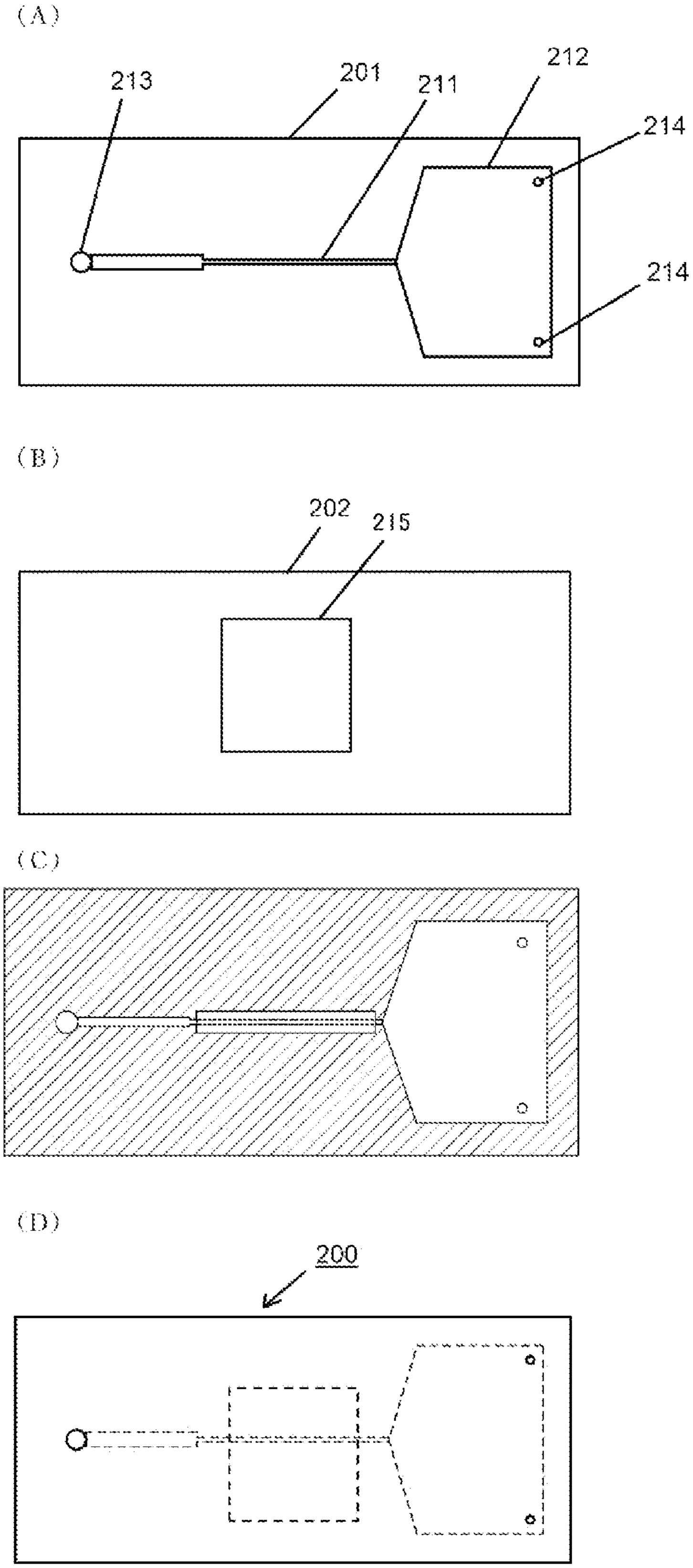
FIGS. 3A to 3D are diagrams illustrating another mode of the method for manufacturing a microchip of the present invention.

The substrate 201 shown in FIG. 3A (injection-molded article manufactured by MCC Advanced Moldings Co., Ltd.; COP resin) (size: 59.4×26.2 mm; thickness, 3 mm) was provided. In the substrate 201, the flow path 211 had a length of 33 mm, a depth of 80 μm, and a width of 1.2 mm in the inlet section or 0.3 mm in the narrow section; and the waste liquid storage section 212 had a length of 16 mm, a depth of 2.2 mm, and a width of 20 mm.

In the substrate 201, the hole that corresponds to the inlet 213 was provided as a penetrating hole having a circular cross-sectional shape with an inner diameter of 2 mm. The hole that corresponds to the air hole 214 was provided as a penetrating hole having a circular cross-sectional shape with an inner diameter of 0.5 mm.

As the film 202, a COP film (size: 56.4×26.2 mm; thickness, 100 μm) was used. A position 215 that corresponds to part of the narrow section, located in the downstream side of the flow path 211 when the film is layered on the substrate 201, was coated with collagen and tissue thromboplastin (FIG. 3B).

The concentrations of the collagen and the tissue thromboplastin used for the coating, and the coating method, were the same as those in Example 1.

The attachment of the substrate 201 to the film 202 was carried out using UVX-8204 (manufactured by Denka Company Limited) such that the surface of the substrate 201 on which the flow path and the waste liquid storage section were provided and the surface of the film 202 coated with collagen and tissue thromboplastin overlapped each other.

More specifically, the adhesive agent was applied by screen printing to the area excluding the area corresponding to the flow path and the waste liquid storage section of the substrate 201 (FIG. 3C), and the film was attached to the substrate 201 (FIG. 3D). Thereafter, irradiation with light having an ultraviolet spectrum with a wavelength range of 200 to 450 nm was carried out. In the case where a mask was provided, a polyimide tape wider than the flow path was attached to the flow path under microscopic observation before the application of the adhesive agent by screen printing. By performing screen printing thereon, application of the adhesive agent to the vicinity of the flow path was prevented. A microchip having no mask, and a microchip having a mask for the area including a margin of about 200 μm from the edge of the flow path, were prepared. The obtained microchips were left to stand at normal temperature for 3 days, and then used in a blood coagulation test.

<Evaluation of Microchips>

Figure 4:
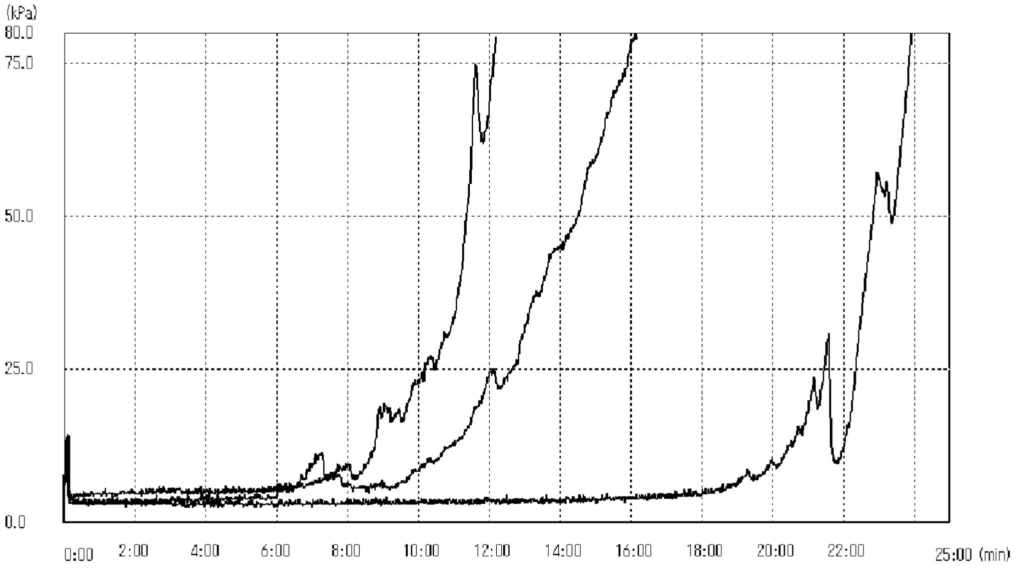
FIG. 4 is a graph showing the result of measurement of the pressure after the introduction of a blood sample to a microchip (FIGS. 3A to 3D) produced by the manufacturing method of the present invention (Example 4).

A blood coagulation test was carried out in the same manner as in Example 1. FIG. 4 shows the result of measurement of the pressure after the introduction of a blood sample to each microchip produced. As a result of the experiment, neither of the chips showed leakage even at a pressure higher than 80 kPa, and a pattern in which a pressure increase occurs as the coagulation reaction proceeds could be detected. Thus, the microchips could be used for the blood coagulation test. In the microchip prepared without a mask, the length of time required for the pressure to reach 80 kPa was about 23 minutes. In the microchip prepared by providing a mask for the area including a margin of about 350 μm from the edge of the flow path, and the microchip prepared by providing a mask for the area including a margin of about 850 μm from the edge of the flow path, the pressure reached 80 kPa after about 12 minutes or about 16 minutes of the test, respectively.

It was found that even the microchip prepared without a mask can be used for the blood coagulation test although the length of time required for the measurement is longer than those in the cases of the microchips using a mask, and hence that use of a mask is not indispensable for the preparation of a microchip for testing blood coagulation.

A possible cause of the requirement of the longer length of time in the measurement may be as follows. In a microchip prepared without providing a mask, the adhesive agent enters the flow path. As a result, factors derived from the adhesive agent, such as eluted low-molecular-weight substances and a change in the flow path shape, may affect the blood coagulation reaction, causing a delay of thrombus formation. In contrast, a microchip prepared using a mask is thought to better reflect blood coagulation reaction since the adhesive agent does not enter the flow path.

However, in the microchip prepared by providing the mask for the area including a margin of about 850 μm, the area without application of the adhesive agent at the edge of the flow path was large, and blood cells were found to have entered between the film and the flow path substrate under the microscope. Thus, in the microchip having a mask for the area including a margin of about 350 μm, the adhesive agent could be prevented from flowing into the flow path, and no gap was formed between the film and the flow path substrate. Therefore, the microchip was found to be suitable for use in a blood coagulation test.

Example 5

<Preparation of Microchip>

Whether or not fluorescent observation of a thrombus is possible using a COP microchip was investigated. The microchip was prepared in the same manner as the microchip prepared without using a mask in Example 4. Since this study focused on the evaluation based on fluorescent observation of a thrombus in the flow path of the microchip, no mask was provided. The obtained microchip was left to stand at normal temperature for not less than 2 days, and then used in a blood coagulation test and fluorescent analysis of a thrombus.

<Evaluation of Microchip>

An evaluation was carried out in terms of whether or not the microchip obtained as described above can be used in a blood coagulation test and fluorescent analysis of a thrombus.

Figure 5:
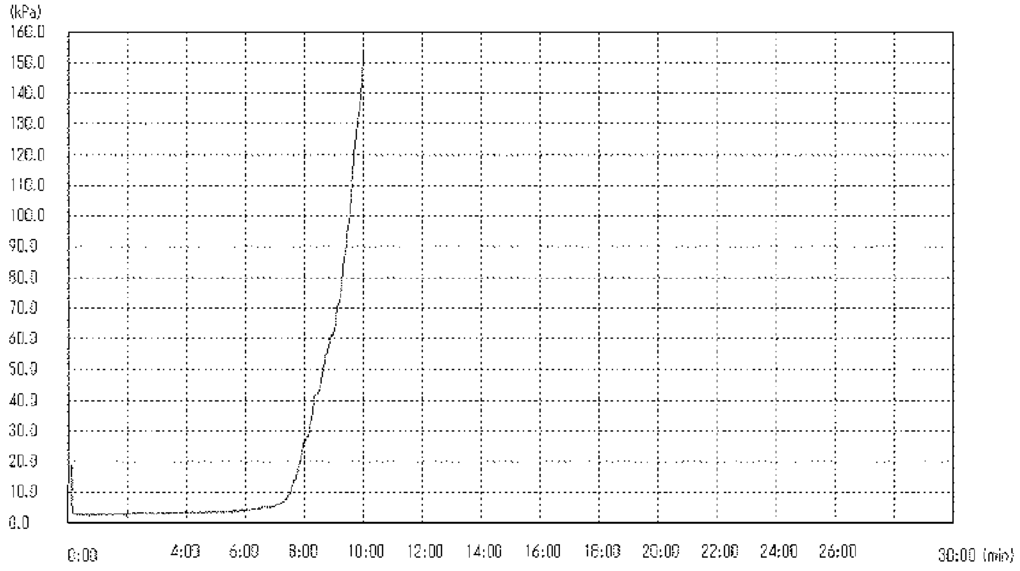
FIG. 5 is a graph showing the result of measurement of the pressure after the introduction of a blood sample to a microchip produced by the manufacturing method of the present invention (Example 5).

FIG. 5 shows the result of measurement of the pressure after the introduction of a blood sample to the produced microchip. In the measurement using the microchip, a pattern in which a pressure increase occurs as the coagulation reaction proceeds could be detected. Further, the microchip did not show leakage even at a pressure higher than 80 kPa, and could be suitably used for the blood coagulation test.

Further, thrombus formation in the flow path could be visually observed.

Fluorescent analysis of a thrombus using a microchip was carried out by the following method.

The microchip was prepared by the same method as in the preparation of the microchip without using a mask in Example 4.

Thrombus observation was carried out in the same manner as in Example 1 and Example 3 except that quinacrine (manufactured by Sigma), which is a staining reagent for platelets, and Hoechst 33342 (manufactured by Dojindo Laboratories), which is a staining reagent for leukocytes based on staining of nuclei, were added at 10 μM and 1 μM, respectively, to the blood immediately after the collection, followed by injection of the resulting sample at a flow rate of 10 μl/minute.

For a thrombus formed in the flow path, excitation of quinacrine at a wavelength of 470 nm was performed using the microscope BZ-X700 (manufactured by Keyence Corporation). As a result, the emission of quinacrine green fluorescence that is thought to be derived from platelets contained in the thrombus could be found. However, when fluorescent observation of a thrombus was carried out using a polypropylene microchip, autofluorescence of the material of the microchip itself was found, so that accurate observation of fluorescence derived from the thrombus component alone was impossible. It was thus found that use of COP as the material of the microchip enables the evaluation of a thrombus formed in the flow path, without being affected by the autofluorescence of the chip material.

Example 6

<Film Surface Treatment>

Whether or not the applicability of a reagent can be improved by surface modification treatment of a COP film (thickness, 100 μm) for the use in the production of the microchip was investigated. As the reagent, a solution prepared by mixing a collagen solution and a tissue thromboplastin solution at 1:1 was used. As the modification treatment method, each of the corona treatment, excimer treatment, and coating with a hydrophilization reagent was carried out.

In the preparation of the film subjected to corona treatment, the corona treatment was carried out as follows: the output was 0.1 kW; the speed of the conveyer carrying the film was 2 m/min; the distance of the treatment stage from the corona discharge bar was 10 mm; and the number of times of irradiation was 2.

In the preparation of the film subjected to excimer treatment, the excimer treatment was carried out using a xenon lamp having a wavelength of 172 nm as follows: the illuminance was 10 mW/cm$^2$; the irradiation time was 100 seconds; and the integrated amount of light was about 1000 mJ/cm$^2$.

In the preparation of the film subjected to treatment with a hydrophilization reagent, 0.1% aqueous solution of a nonionic surfactant LWA-1570 was used as the hydrophilization reagent. The COP film was soaked in 0.1% aqueous LWA-1570 solution for 3 hours, and then rinsed with water, followed by drying at normal temperature to achieve the coating.

<Evaluation of Film Surface Treatment>

An evaluation of the applicability of the reagent was carried out by adding 2 μl of an aqueous solution of collagen and tissue thromboplastin dropwise onto the film, and then measuring the contact angle formed by the droplet surface and the film surface. The contact angle was measured by the tangent method in which the vicinity of the endpoint of the droplet was regarded as part of a circle to determine the tangent line at the endpoint. As a result of the measurement, the contact angle of the aqueous solution of collagen and tissue thromboplastin with respect to the untreated COP film was found to be 81.0°. The untreated COP film had low affinity to the aqueous solution of collagen and tissue thromboplastin, resulting in difficulty in uniform application of 38.5 μl of the solution to the area of 15 mm×10 mm on the film, which is a condition required for the preparation of the microchip described in Example 1. In contrast, the contact angle of the aqueous solution of collagen and tissue thromboplastin with respect to the COP film subjected to the corona treatment or excimer treatment was found to be 52.6° or 43.8°, respectively. Compared to the untreated film, the COP film subjected to the corona treatment or excimer treatment had improved affinity to the aqueous solution of collagen and tissue thromboplastin, and uniform application of 38.5 μl of the solution to the area of 15 mm×10 mm on the film was possible. The contact angle of the aqueous solution of collagen and tissue thromboplastin with respect to the COP film subjected to the hydrophilization treatment with 0.1% aqueous LWA-1570 solution was found to be 10.0°. The COP film showed largely improved affinity to the aqueous solution of collagen and tissue thromboplastin compared to the untreated film, but accurate application of the solution only to the predetermined area was difficult since wet spreading of the droplet extensively occurred. From these results, it was found that the surface modification of the COP film enables improvement of the applicability of the reagent. It was also found that, in cases where a reagent needs to be accurately applied to a predetermined area, favorable application can be achieved by modifying the film surface such that the contact angle of the reagent with respect to the film is at least 40 to 55°.

DESCRIPTION OF SYMBOLS

10 . . . microchip; 1 . . . substrate; 11 . . . flow path; 12 . . . inlet; 13 . . . air hole; 14 . . . waste liquid storage section; 15 . . . narrow section; 2 . . . film; 21 . . . collagen- and/or tissue thromboplastin-coated section; 200 . . . microchip; 201 . . . substrate; 211 . . . flow path; 212 . . . waste liquid storage section; 213 . . . inlet; 214 . . . air hole; 202 . . . film; 215 . . . collagen- and/or tissue thromboplastin-coated section

What is claimed is:

1. A method for manufacturing a microchip for testing blood coagulation, comprising:

providing a substrate comprising on a surface thereof a groove serving as a flow path, wherein the substrate comprises a first penetrating hole serving as an inlet at one end of the groove and a second penetrating hole serving as an air hole at the other end of the groove;

providing a film on a surface of which collagen and/or tissue thromboplastin is/are applied in such a manner that an area on the flow path is covered therewith when the film is attached to the substrate; and attaching the film on the substrate in such a manner that the surface of the substrate on which the groove is formed and the surface of the film on which collagen and/or tissue thromboplastin is/are applied overlap each other.

2. The method for manufacturing a microchip for testing blood coagulation according to claim 1, wherein the attachment is carried out using an adhesive agent and/or a gluing agent.

3. The method for manufacturing a microchip for testing blood coagulation according to claim 2, wherein the adhesive agent and/or the gluing agent is/are applied at a thickness of 5 to 15 μm with a margin of 200 to 1000 μm from each of both sides of the width of the flow path.

4. The method for manufacturing a microchip for testing blood coagulation according to claim 2, wherein the adhesive agent is a UV-curable adhesive agent.

5. The method for manufacturing a microchip for testing blood coagulation according to claim 4, wherein the UV-curable adhesive agent is an acrylic UV-curable adhesive agent.

6. The method for manufacturing a microchip for testing blood coagulation according to claim 2, wherein the adhesive agent is applied to the substrate by screen printing.

7. The method for manufacturing a microchip for testing blood coagulation according to claim 1, wherein an attachment surface of the substrate and/or an attachment surface of the film is/are hydrophilized in such a manner that a water contact angle is 40 to 55°.

8. The method for manufacturing a microchip for testing blood coagulation according to claim 1, wherein an attachment surface of the substrate and/or an attachment surface of the film is/are subjected to plasma treatment, corona treatment or excimer treatment.

9. A microchip for testing blood coagulation, comprising:

a substrate comprising on a surface thereof a groove serving as a flow path, wherein the substrate comprises a first penetrating hole serving as an inlet at one end of the groove and a second penetrating hole serving as an air hole at the other end of the groove; and a film on a surface of which collagen and/or tissue thromboplastin is/are applied in such a manner that an area on the flow path is covered therewith when the film is attached to the substrate, wherein the substrate and the film are attached to each other in such a manner that the surface of the substrate on which the groove is formed and the surface of the film on which collagen and/or tissue thromboplastin is/are applied overlap each other.

* * * * *